(12) United States Patent
Luo (10) Patent No.: US 12,113,564 B2
(45) Date of Patent: Oct. 8, 2024

(54) PROTECTIVE CASE OF FOLDING SCREEN MOBILE PHONE

(71) Applicant: GKK Technology Co., LTD, Shenzhen (CN)

(72) Inventor: Yanxia Luo, Shenzhen (CN)

(73) Assignee: GKK TECHNOLOGY CO., LTD, Shenzhen (CN)

( * ) Notice: Subject to any disclaimer, the term of this patent is extended or adjusted under 35 U.S.C. 154(b) by 343 days.

(21) Appl. No.: 17/865,406

(22) Filed: Jul. 15, 2022

(65) Prior Publication Data

US 2023/0016617 A1    Jan. 19, 2023

(30) Foreign Application Priority Data

Jul. 16, 2021   (CN) .......................... 202121622933.6

(51) Int. Cl.
*H04B 1/3888* (2015.01)
*H04M 1/02* (2006.01)

(52) U.S. Cl.
CPC ........ *H04B 1/3888* (2013.01); *H04M 1/0214* (2013.01)

(58) Field of Classification Search
CPC .................................................... H04B 1/3888
See application file for complete search history.

(56) References Cited

U.S. PATENT DOCUMENTS

| 8,738,101 | B1 * | 5/2014 | Myr | H04M 1/0214 |
| | | | | 379/330 |
| 10,627,856 | B1 * | 4/2020 | Chang | H04M 1/0216 |
| 2020/0051468 | A1 * | 2/2020 | Jung | G06F 1/1616 |

* cited by examiner

*Primary Examiner* — Hsinchun Liao
(74) *Attorney, Agent, or Firm* — Bayramoglu Law Offices LLC (57) ABSTRACT

A protective case of a folding screen mobile phone includes a front protective case, a rear protective case, a soft connecting mechanism and a hinge protector. The front protective case is provided with a transparent window or a hollow-out window. One end of the soft connecting mechanism is fixedly connected to the rear protective case, another end of the soft connecting mechanism is connected to one side of the hinge protector, and a hinge positioning mechanism is provided between another side of the hinge protector and the front protective case; or, one end of the soft connecting mechanism is fixedly connected to the front protective case, another end of the soft connecting mechanism is connected to one side of the hinge protector, and a hinge positioning mechanism is provided between another side of the hinge protector and the rear protective case.

10 Claims, 8 Drawing Sheets

PROTECTIVE CASE OF FOLDING SCREEN MOBILE PHONE

CROSS REFERENCE TO THE RELATED APPLICATIONS

This application is based upon and claims priority to Chinese Patent Application No. 202121622933.6, filed on Jul. 16, 2021, the entire contents of which are incorporated herein by reference.

TECHNICAL FIELD

The present application relates to the technical field of mobile phone accessories, and in particular to a protective case of a folding screen mobile phone.

BACKGROUND

With the development of science and technology, major mobile phone manufactures around the world have launched folding screen mobile phones one after another. The structural characteristics of the mobile phone itself determine that the protective case cannot achieve relatively complete and full-cover protection, especially the protection for the hinge part. The hinge part is the most critical structural component of the folding screen mobile phone. The hinge part being costive and difficult to repair is a common pain point for various folding screen mobile phones on the market. According to surveys, for the folding screen protective case products currently on the market, protection for the hinge part is basically realized by using soft leather to wrap the hinge part with a flip cover, which cannot effectively protect the hinge part from falling, bumping, and impact.

SUMMARY

In view of the above, a protective case of a folding screen mobile phone is provided according to the present application, so as to solve the problem that the mobile phone case in the conventional technology cannot effectively protect the hinge part of the folding screen mobile phone.

In order to achieve the above object, the following technical solutions are provided according to the present application.

The protective case of a folding screen mobile phone includes a front protective case, a rear protective case, a soft connecting mechanism and a hinge protector. The front protective case is provided with a transparent window or a hollow-out window. One end of the soft connecting mechanism is fixedly connected to the rear protective case, another end of the soft connecting mechanism is connected to one side of the hinge protector, and a hinge positioning mechanism is provided between another side of the hinge protector and the front protective case; or, one end of the soft connecting mechanism is fixedly connected to the front protective case, another end of the soft connecting mechanism is connected to one side of the hinge protector, and a hinge positioning mechanism is provided between another side of the hinge protector and the rear protective case.

Further, the soft connecting mechanism includes a first soft connecting piece and a second soft connecting piece. One side of the first soft connecting piece and one side of the second soft connecting piece are respectively connected to two sides of the rear protective case. Another side of the first soft connecting piece and another side of the second soft connecting piece are respectively connected to the hinge protector.

Further, the first soft connecting piece is L-shaped, and an upper side of the rear protective case is provided with an L-shaped upper fixing groove. The one side of the first soft connecting piece is fixed in the upper fixing groove, and the another side of the first soft connecting piece protrudes out of the upper fixing groove.

Further, the lower side of the rear protective case is provided with a lower fixing groove. The one side of the second soft connecting piece is fixed in the lower fixing groove, and the another side of the second soft connecting piece protrudes out of the lower fixing groove.

Further, the one side of the hinge protector is provided with a connecting edge. The another side of the first soft connecting piece and the another side of the second soft connecting piece are respectively fixedly connected to two sides of the connecting edge.

Further, the hinge positioning mechanism includes a hinge magnet and a front cover magnet. The hinge magnet is fixed on the another side of the hinge protector, and the front cover magnet is fixed on one side of the front protective case. The hinge magnet and the front cover magnet are configured to attract each other.

Further, the another side of the hinge protector is provided with multiple hinge magnet mounting grooves, and the hinge magnets are arranged in the hinge magnet mounting grooves. The one side of the front protective case is provided with multiple front cover magnet mounting grooves, and the front cover magnets are arranged in the front cover magnet mounting grooves.

Further, the one side of the front protective case is provided with a front cover corner edge which protrudes upwards, and the another side of the hinge protector is arranged on one side of the front cover corner edge.

Further, the lower side of the rear protective case is further provided with a folding bracket.

Further, the folding bracket includes a bracket seat and a folding plate, and the lower side of the rear protective case is provided with a bracket mounting groove. The bracket seat is fixed in the bracket mounting groove, and the lower side of the bracket seat is provided with a folding plate mounting groove. The folding plate is arranged in the folding plate mounting groove. One end of the folding plate is rotatably connected with the bracket seat, and a return spring is arranged between the folding plate and the bracket seat.

The present application has the following advantages.

According to the present application, a hinge protector is arranged between the front protection case and the rear protection case, and the hinge protector can effectively protect the hinge part of the folding screen mobile phone. When the user unfolds the mobile phone, the front protective case and the rear protective case are unfolded along with the screen of the mobile phone, the front protection case pushes away the hinge positioning mechanism of the hinge protector and flips rearward, and, the hinge protector also flips rearward under the pushing force of the front protective case and translates rearward under the deformation and cooperation of the soft connecting mechanism, so as to make room for the flipping of the hinge protector; in the flattened state, the hinge protector is propped up against the front protective case under the resilience action of the soft connecting mechanism, so that the hinge protector is always closely attached to the front protective case and will not hang down loosely. When the user folds the mobile phone screen, the hinge protector is folded upwards under the resilience action of the soft connecting mechanism. In the folding process, the hinge protector is connected with the front protective case via the positioning mechanism and returns to the original state.

BRIEF DESCRIPTION OF THE DRAWINGS

In order to illustrate solutions of the embodiments of the present application or in the conventional technology more clearly, the drawings used in the description of the embodiments or of the conventional technology are briefly described below. It is apparent that the drawings in the following description are only exemplary. For those of ordinary skill in the art, other implementation drawings can be derived from the provided drawings without any creative work.

The structure, proportion, and size shown in the drawings of the specification are only used to match the contents disclosed in the specification for those skilled in the art to understand and read and are not intend to limit the conditions under which the present application can be implemented, having no technically significance. Any modification of structure, change of proportional relationship, or adjustment of size should still fall within the scope of the technical content disclosed in the present application without affecting the efficacy and purpose of the present application.

Reference numerals in the drawings: 1 rear protective case, 2 front protective case, 3 hinge protector, 4 first soft connecting piece, 5 second soft connecting piece, 6 connecting edge, 7 folding bracket, 8 front cover corner edge, 9 hinge magnet, 10 front cover magnet, 11 hinge magnet mounting groove, 12 front cover magnet mounting groove, 13 upper fixing groove, 14 folding screen mobile phone, 15 lower fixing groove, 16 bracket mounting groove, 17 bracket seat, 18 folding plate, 19 return spring, 201 hollow-out window.

DETAILED DESCRIPTION OF THE EMBODIMENTS

The embodiments of the present application are illustrated below by the specific examples. Those skilled in the art can readily understand other advantages and effects of the present application from the contents disclosed in this specification. It is apparent that the described embodiments are only some rather than all of the embodiments of the present application. Based on the embodiments in the present application, all of other embodiments, made by the person skilled in the art without any creative efforts, fall into the scope of protection of the present application. Terms such as "upper", "lower", "left", "right" and "middle" quoted in this specification are only for ease of description and clarity, and are not used to limit the applicable scope of the present application. Variants in which the relative relationship is altered or adjusted without substantively changing the technical content shall still be deemed to fall in the applicable scope of the present application.

First Embodiment

Figure 1:
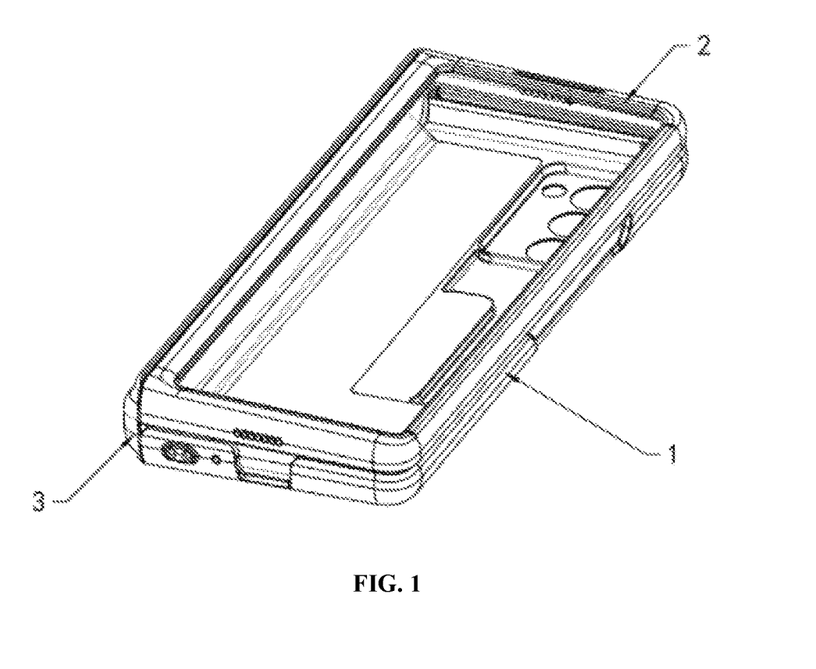
FIG. 1 is a perspective view of a protective case of a folding screen mobile phone provided in the first embodiment of the present application.
Figure 2:
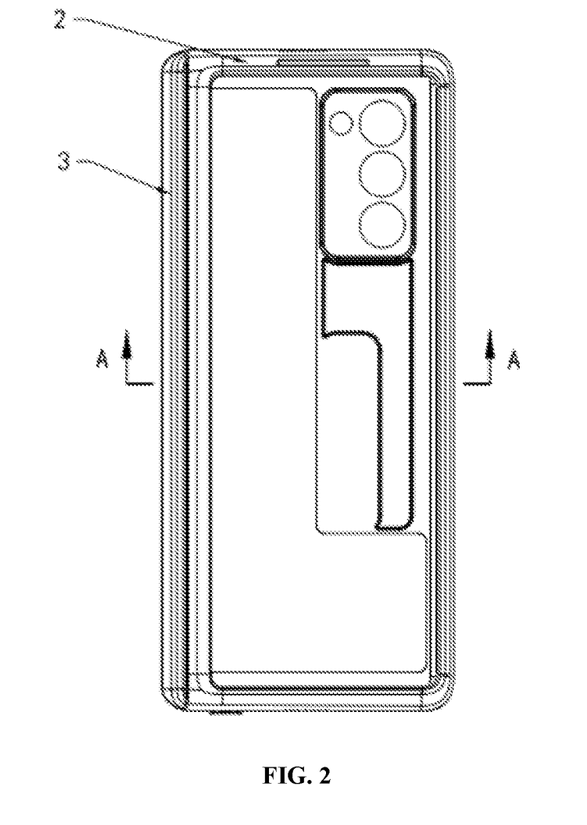
FIG. 2 is a front view of the protective case of a folding screen mobile phone provided in the first embodiment of the present application.
Figure 3:
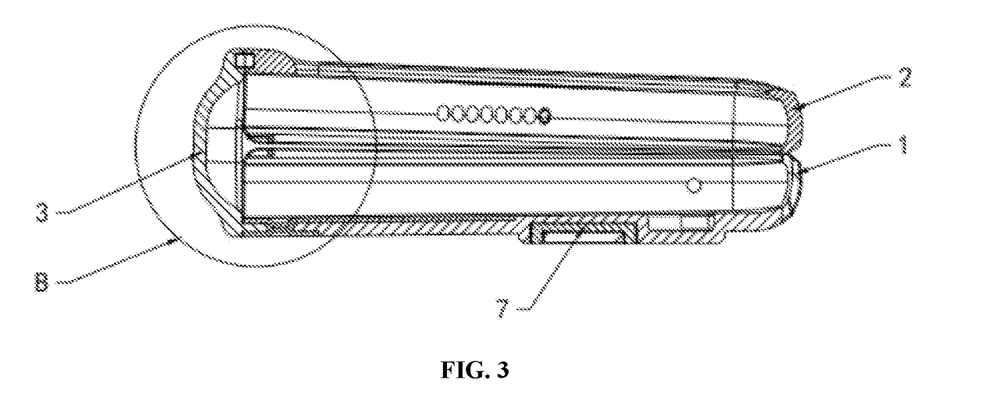
FIG. 3 is a cross-sectional view of FIG. 2, taken along line A-A.

As shown in FIGS. 1 and 3, the protective case of the folding screen mobile phone includes the front protective case 2, the rear protective case 1, the soft connecting mechanism and the hinge protector 3. The front protective case 2 is provided with the transparent window or the hollow-out window 201. One end of the soft connecting mechanism is fixedly connected to the rear protective case 1, another end of the soft connecting mechanism is connected to one side of the hinge protector 3, and the hinge positioning mechanism is provided between another side of the hinge protector 3 and the front protective case 2. The hinge protector 3 in this embodiment is made of the hard material, so as to better protect the hinge part of the folding screen mobile phone 14.

In this embodiment, the lower side of the rear protective case 1 is further provided with the folding bracket 7. In addition, the bracket mounting groove 16 is provided on the lower side of the rear protective case 1, and the folding bracket 7 is fixed in the bracket mounting groove 16. The folding bracket 7 can support the mobile phone after being unfolded, so that the mobile phone can be placed obliquely for easy viewing.

Figure 4:
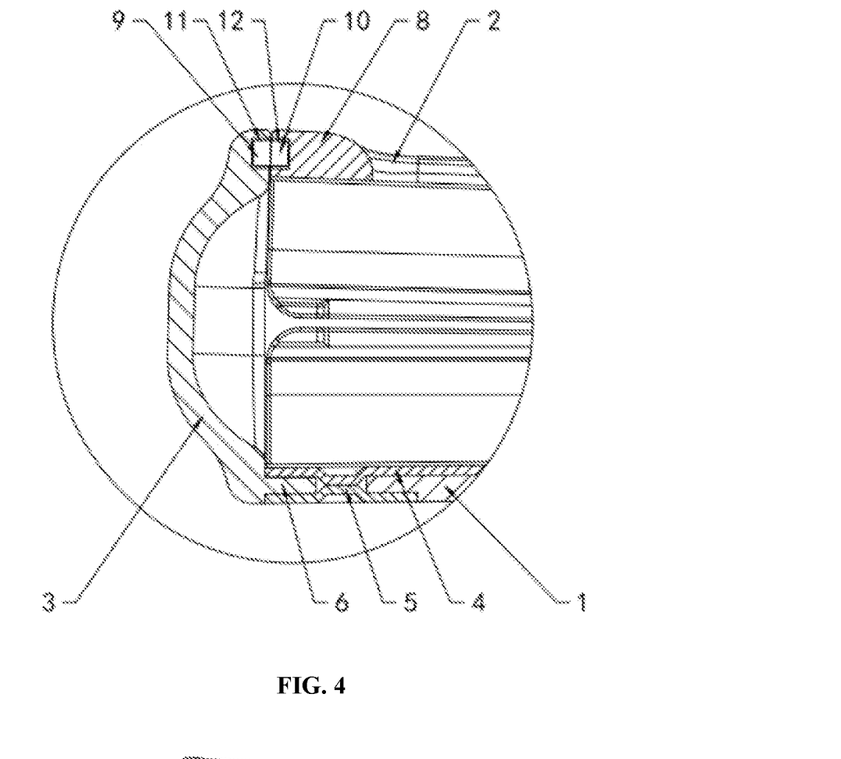
FIG. 4 is a partially enlarged view of portion B in FIG. 3.

As shown in FIG. 4, the soft connecting mechanism in this embodiment includes the first soft connecting piece 4 and the second soft connecting piece 5. One side of the first soft connecting piece 4 and one side of the second soft connecting piece 5 are respectively connected to two sides of the rear protective case 1. Another side of the first soft connecting piece 4 and another side of the second soft connecting piece 5 are respectively connected to the hinge protector 3. One side of the hinge protector 3 is provided with the connecting edge 6. The another side of the first soft connecting piece 4 and the another side of the second soft connecting piece 5 are respectively fixedly connected to two sides of the connecting edge 6.

The hinge positioning mechanism includes the hinge magnet 9 and the front cover magnet 10. The hinge magnet 9 is fixed on the another side of the hinge protector 3, and the front cover magnet 10 is fixed on one side of the front protective case 2. The hinge magnet 9 and the front cover magnet 10 are configured to attract each other. The another side of the hinge protector 3 is provided with multiple hinge magnet mounting grooves 11, and the hinge magnets 9 are arranged in the hinge magnet mounting grooves 11. The one side of the front protective case 2 is provided with multiple front cover magnet mounting grooves 12, and the front cover magnets 10 are arranged in the front cover magnet mounting grooves 12.

The use experience of the protective case of the folding screen mobile phone brought by the combination of the resilience function of the soft connecting mechanism and the magnetic attraction recover is quite futuristic. It is silky in use and smooth when folding. The positioning of magnetic attraction recover is accurate, and the experience is favorable. Therefore, the combination of the resilience function of the soft connecting mechanism and the magnetic attraction recover is an excellent solution for the full-cover protective case of the folding screen mobile phone.

The one side of the front protective case 2 is provided with the front cover corner edge 8 which protrudes upwards, and the another side of the hinge protector 3 is arranged on one side of the front cover corner edge 8. When the user unfolds the folding screen mobile phone 14, the front protective case 2 and the rear protective case 1 are unfolded along with the screen of the mobile phone, the front cover corner edge 8 pushes away the hinge magnet 9 of the hinge protector 3 and flips rearward, and, the hinge protector 3 also flips rearward under the pushing force of the front protective case. The folding screen mobile phone 14 can be unfolded directly while the hinge protector 3 will not generate resistance, so that the use thereof is more convenient.

Figure 5:
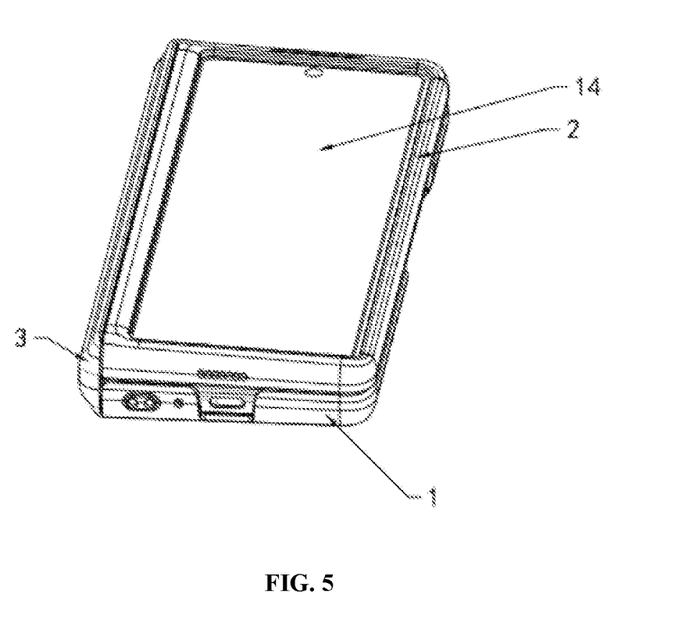
FIG. 5 is a schematic view of the protective case of a folding screen mobile phone fixed on a folding screen mobile phone according to the first embodiment of the present application.
Figure 6:
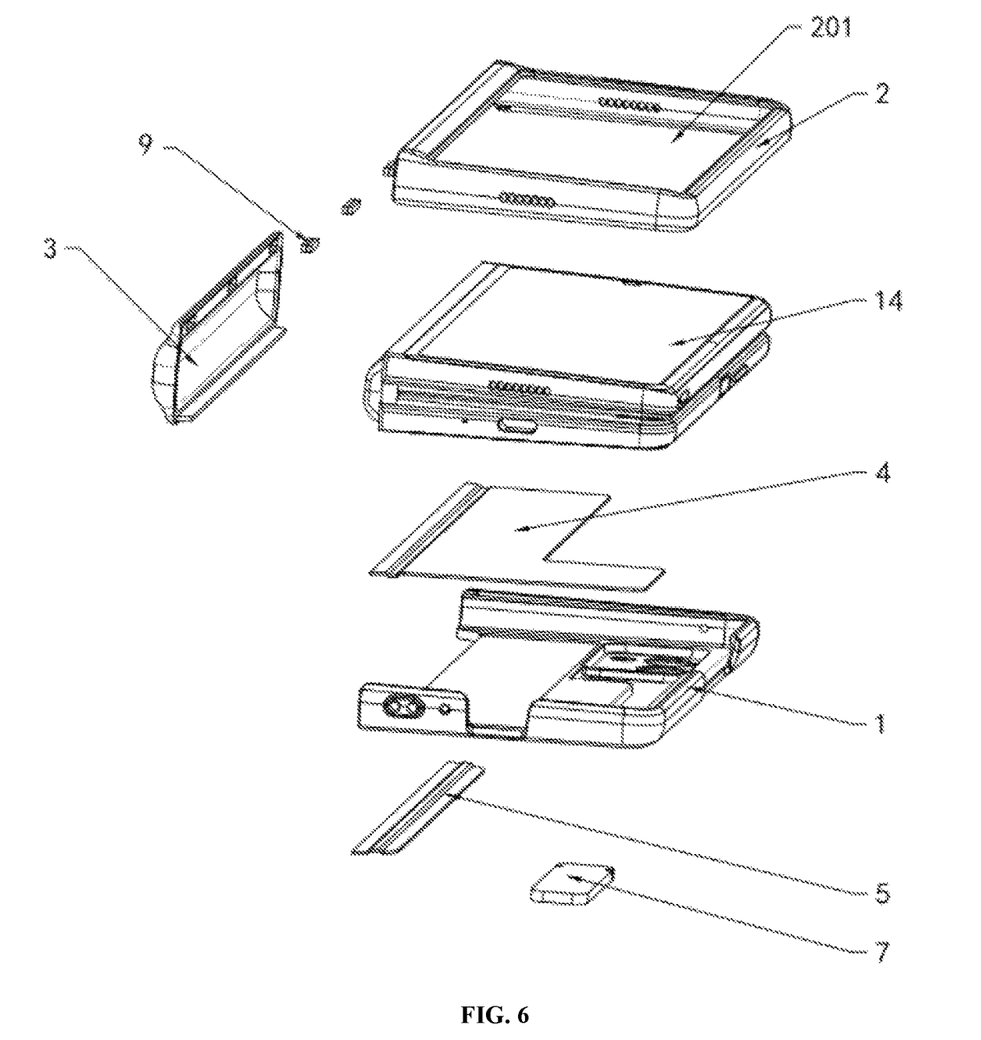
FIG. 6 is an exploded view of the protective case of a folding screen mobile phone fixed on a folding screen mobile phone according to the first embodiment of the present application.
Figure 7:
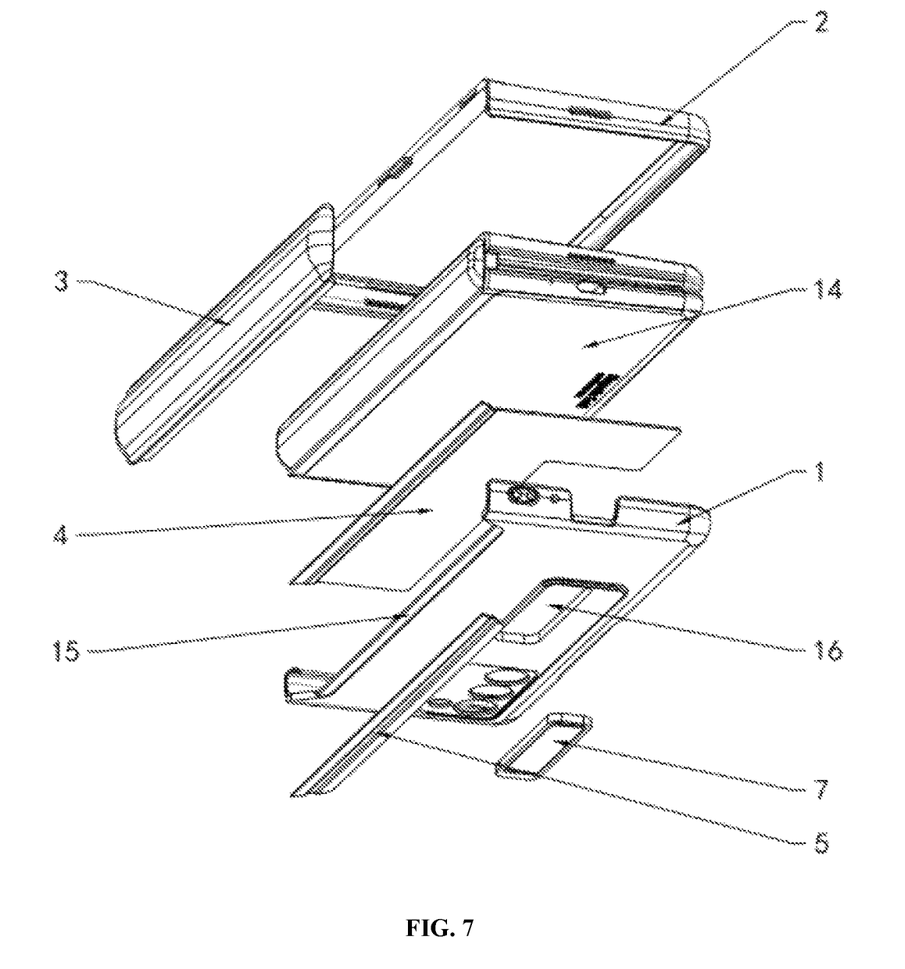
FIG. 7 is an exploded view of the protective case of a folding screen mobile phone fixed on the folding screen mobile phone according to the first embodiment of the present application, viewed from a bottom side.
Figure 8:
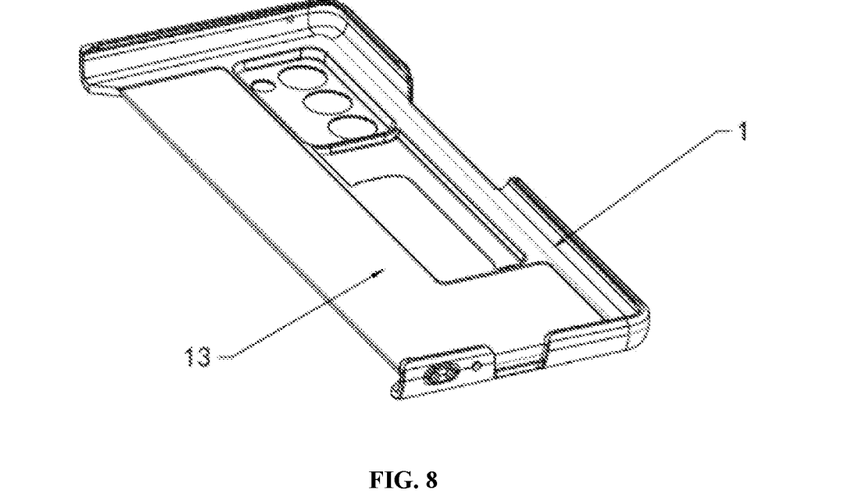
FIG. 8 is a schematic view of a rear protective case according to the first embodiment of the present application.

As shown in FIGS. 5 and 8, the front protective case 2 of this embodiment is engaged with the front edge of the folding screen mobile phone 14, and the rear protective case 1 is engaged with the rear edge of the folding screen mobile phone 14. After the folding screen mobile phone 14 is folded, the small screen of the folding screen mobile phone 14 can be viewed from the hollow-out window 201 on the front protective case 2.

The first soft connecting piece 4 is L-shaped, and an upper side of the rear protective case 1 is provided with an L-shaped upper fixing groove 13. The rear protective case 1 is provided with the camera hole for exposing the camera in the area other than the upper fixing groove 13. One side of the first soft connecting piece 4 is fixed in the upper fixing groove 13, and another side of the first soft connecting piece 4 protrudes out of the upper fixing groove 13. The lower side of the rear protective case 1 is provided with the lower fixing groove 15. One side of the second soft connecting piece 5 is fixed in the lower fixing groove 15, and another side of the second soft connecting piece 5 protrudes out of the lower fixing groove 15.

Figure 9:
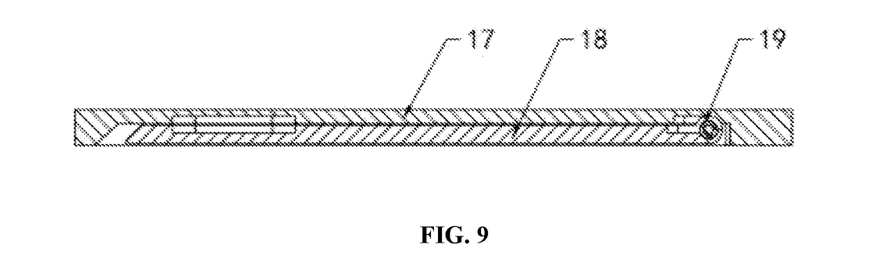
FIG. 9 is a cross-sectional view of a folding bracket according to the first embodiment of the present application.

As shown in FIG. 9, the folding bracket 7 includes the bracket seat 17 and the folding plate 18. The bracket seat 17 is fixed in the bracket mounting groove 16, and the lower side of the bracket seat 17 is provided with the folding plate mounting groove. The folding plate 18 is arranged in the folding plate mounting groove. One end of the folding plate 18 is rotatably connected with the bracket seat 17, and the return spring 19 is arranged between the folding plate 18 and the bracket seat 17. The folding plate 18 is flipped to swing away from the bracket seat 17 against the resistance of the return spring 19, and the folding plate 18 and the rear protective case 1 can be kept relatively fixed by frictional force, so that the folding screen mobile phone 14 can be supported on the desktop. When the folding screen mobile phone 14 is picked up from the desktop, the folding plate 18 is folded into the folding plate mounting groove of the bracket seat 17 under drive of the return spring 19.

Figure 10:
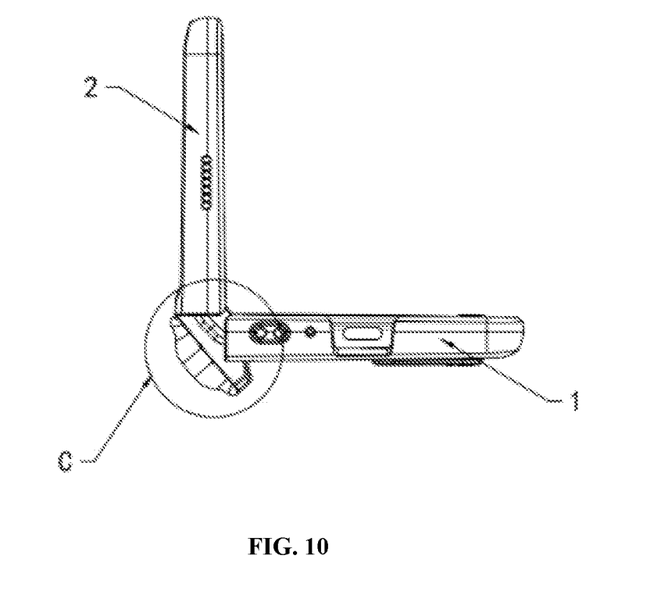
FIG. 10 is a schematic view of the folding screen mobile phone according to the first embodiment of the present application when it is opened to 90°.
Figure 11:
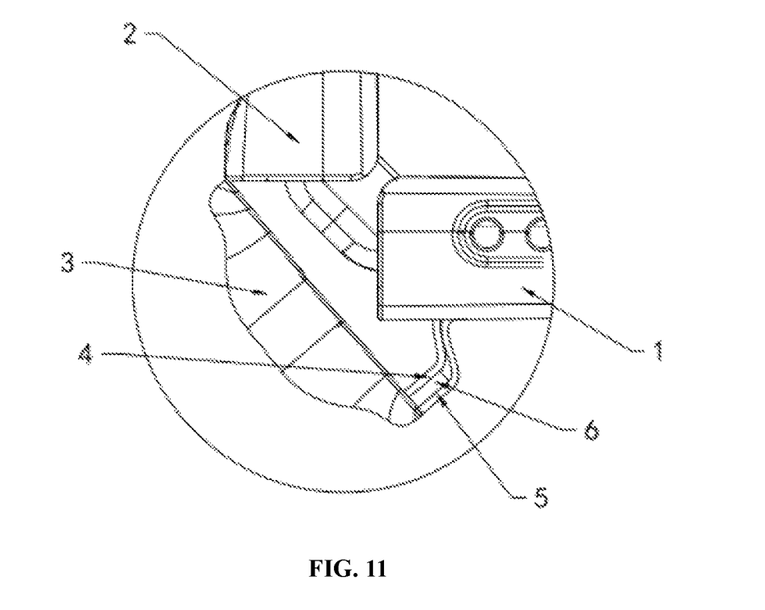
FIG. 11 is a partially enlarged view of portion C in FIG. 10.

As shown in FIGS. 10 and 11, when the user unfolds the mobile phone, the front protective case 2 and the rear protective case 1 are unfolded along with the screen of the mobile phone, the front protection case 2 pushes away the hinge magnet 9 of the hinge protector 3 and flips rearward, and, the hinge protector 3 also flips rearward under the pushing force of the front protective case 2 and translates rearward under the deformation and cooperation of the soft connecting mechanism, so as to make room for the flipping of the hinge protector 3.

Figure 12:
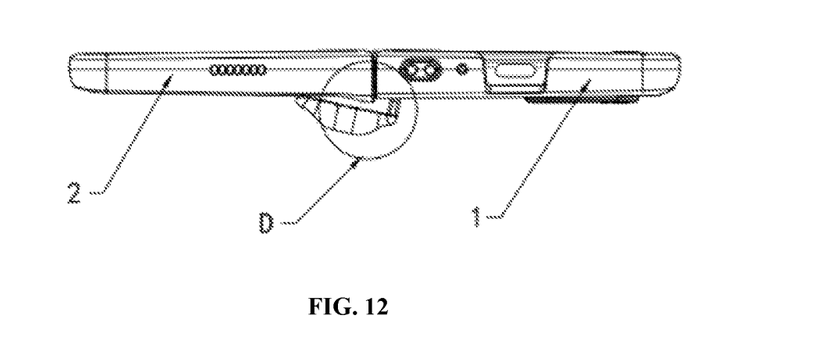
FIG. 12 is a schematic view of the folding screen mobile phone according to the first embodiment of the present application when it is fully unfolded.
Figure 13:
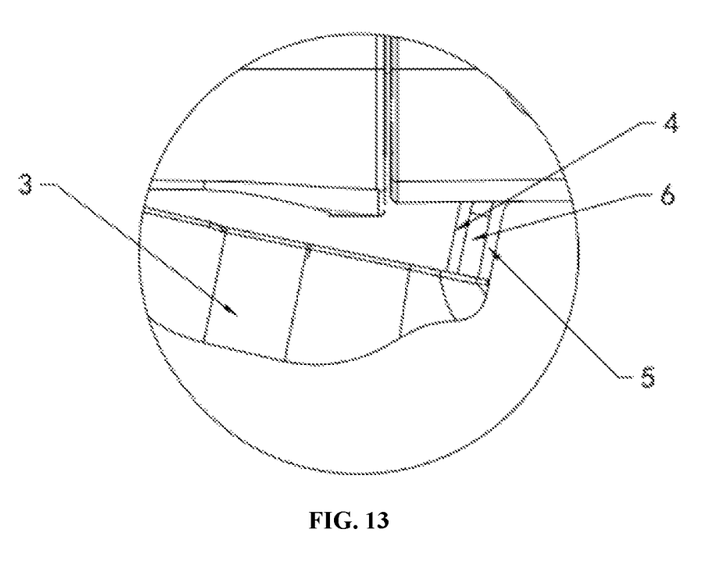
FIG. 13 is a partially enlarged view of portion D in FIG. 12.

As shown in FIGS. 12 and 13, in the flattened state, the hinge protector 3 is propped up against the front protective case 2 under the resilience action of the soft connecting mechanism, so that the hinge protector 3 is always closely attached to the front protective case 2 and will not hang down loosely.

When the user folds the mobile phone screen, the hinge protector 3 is folded upwards under the resilience action of the soft connecting mechanism. In the folding process, the hinge protector 3 is connected with the front protective case 2 via the positioning mechanism and returns to the original state. According to the present application, the hinge protector 3 can effectively protect the hinge part of the folding screen mobile phone 14.

Second Embodiment

In this embodiment, one end of the soft connecting mechanism is fixedly connected with the front protective case 2, and another end of the soft connecting mechanism is connected with one side of the hinge protector 3, and another side of the hinge protector 3 and the rear protective case 1 are positioned by magnets. In this embodiment, the hinge protector 3 and the soft connecting mechanism are reversely connected compared to the embodiment 1. However, both embodiments can effectively protect the hinge part of the folding screen mobile phone 14.

Although the present application has been described in detail above with general descriptions and specific embodiments, some modifications or improvements can be made thereto on the basis of the present application, which are obvious to those skilled in the art. Therefore, these modifications or improvements made without departing from the spirit of the present application belong to the protection scope of the present application.

What is claimed is:

1. A protective case of a folding screen mobile phone, comprising
a front protective case, a rear protective case, a soft connecting mechanism and a hinge protector;
wherein the front protective case is provided with a transparent window or a hollow-out window;
wherein a first end of the soft connecting mechanism is fixedly connected to the rear protective case;
a second end of the soft connecting mechanism is connected to a first side of the hinge protector;
and a hinge positioning mechanism is provided between a second side of the hinge protector and the front protective case; or,
the first end of the soft connecting mechanism is fixedly connected to the front protective case;

the second end of the soft connecting mechanism is connected to the first side of the hinge protector; and the hinge positioning mechanism is provided between the second side of the hinge protector and the rear protective case.

2. The protective case of the folding screen mobile phone according to claim 1, wherein the soft connecting mechanism comprises a first soft connecting piece and a second soft connecting piece;

wherein a first side of the first soft connecting piece and a first side of the second soft connecting piece are respectively connected to two sides of the rear protective case; and a second side of the first soft connecting piece and a second side of the second soft connecting piece are respectively connected to the hinge protector.

3. The protective case of the folding screen mobile phone according to claim 2, wherein the first soft connecting piece is L-shaped, and an upper side of the rear protective case is provided with an L-shaped upper fixing groove;

wherein the first side of the first soft connecting piece is fixed in the upper fixing groove; and the second side of the first soft connecting piece protrudes out of the upper fixing groove.

4. The protective case of the folding screen mobile phone according to claim 2, wherein a lower side of the rear protective case is provided with a lower fixing groove;

wherein the first side of the second soft connecting piece is fixed in the lower fixing groove; and the second side of the second soft connecting piece protrudes out of the lower fixing groove.

5. The protective case of the folding screen mobile phone according to claim 2, wherein the first side of the hinge protector is provided with a connecting edge;

wherein the second side of the first soft connecting piece and the second side of the second soft connecting piece are respectively fixedly connected to two sides of the connecting edge.

6. The protective case of the folding screen mobile phone according to claim 1, wherein the hinge positioning mechanism comprises a hinge magnet and a front cover magnet;

wherein the hinge magnet is fixed on the second side of the hinge protector; and the front cover magnet is fixed on a side of the front protective case;

wherein the hinge magnet and the front cover magnet are configured to attract each other.

7. The protective case of the folding screen mobile phone according to claim 6, wherein the second side of the hinge protector is provided with a plurality of hinge magnet mounting grooves;

and hinge magnets are arranged in the hinge magnet mounting grooves;

wherein the side of the front protective case is provided with a plurality of front cover magnet mounting grooves;

and front cover magnets are arranged in the front cover magnet mounting grooves.

8. The protective case of the folding screen mobile phone according to claim 6, wherein the side of the front protective case is provided with a front cover corner edge protruding upwards, and the second side of the hinge protector is arranged on a side of the front cover corner edge.

9. The protective case of the folding screen mobile phone according to claim 1, wherein a lower side of the rear protective case is further provided with a folding bracket.

10. The protective case of the folding screen mobile phone according to claim 9, wherein the folding bracket comprises a bracket seat and a folding plate, and the lower side of the rear protective case is provided with a bracket mounting groove;

wherein the bracket seat is fixed in the bracket mounting groove;

a lower side of the bracket seat is provided with a folding plate mounting groove;

wherein the folding plate is arranged in the folding plate mounting groove;

wherein an end of the folding plate is rotatably connected with the bracket seat; and a return spring is arranged between the folding plate and the bracket seat.

* * * * *